March 29, 1966   P. BERGONZO   3,243,027
CONE CLUTCH WITH ADJUSTING MEANS
Filed March 10, 1964
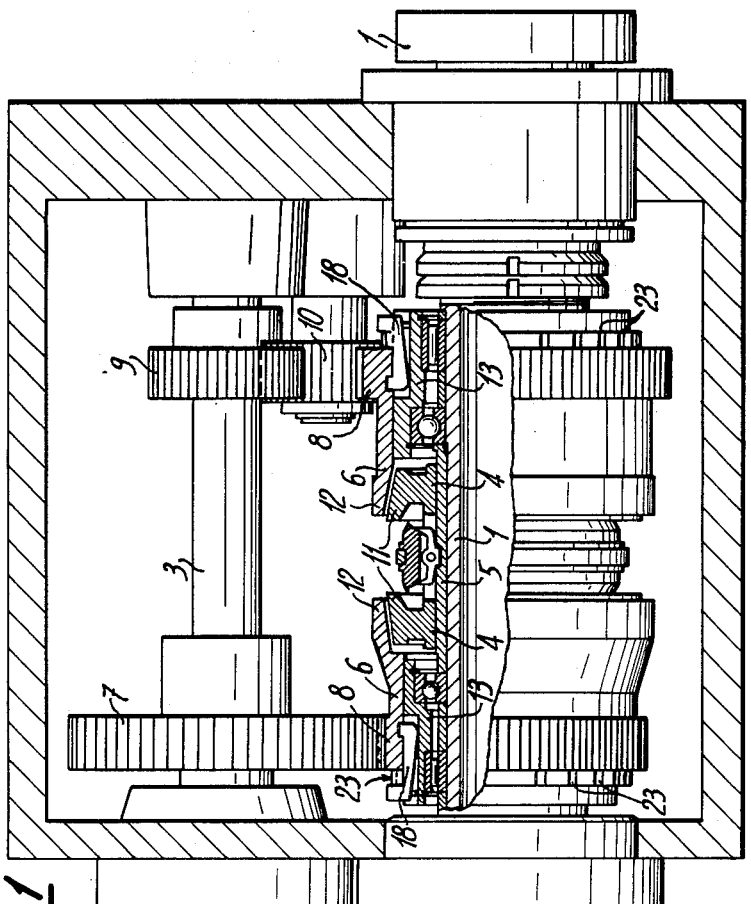
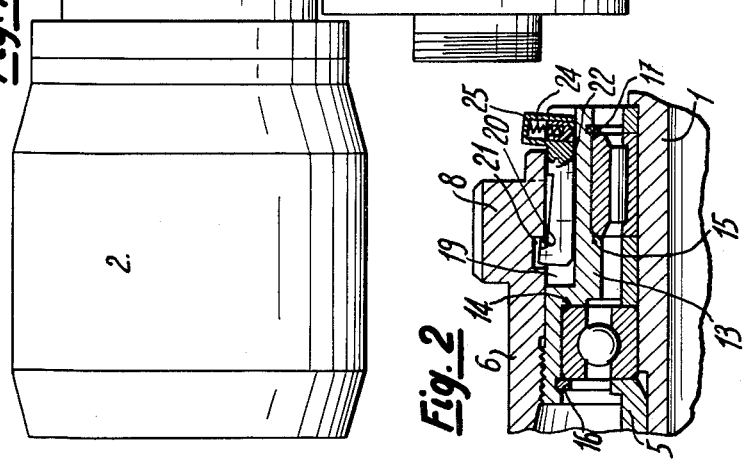

United States Patent Office 3,243,027
Patented Mar. 29, 1966

3,243,027
CONE CLUTCH WITH ADJUSTING MEANS
Pierre Bergonzo, 117 Rte. de la Capite, Cologny,
Geneva, Switzerland
Filed Mar. 10, 1964, Ser. No. 350,829
Claims priority, application Switzerland, Mar. 15, 1963,
3,347/63
1 Claim. (Cl. 192—111)

The greater number of cone clutches and in particular cone clutches employed in devices for the reversal of the direction of rotation of a spindle of a machine-tool, for example, comprise an adjustment of device allowing of adjusting the contact pressure between the male cone and the female cone. In cone clutches of this kind existing at present, the driving couple is transmitted through the agency of this adjusting device. The presents a serious drawback, in fact one is led to make use of locking means for the adjusting device, whereby said locking means must be sufficiently strong to guarantee that the adjustment of the contact pressure of the clutch cones may be maintained in spite of the transmission of the couple. Moreover, since these devices are subjected to substantial alternate accelerations, appreciable play rapidly develops between the members transmitting the couple, which is obviously undesirable.

The present invention has for an object the provision of a cone clutch comprising a contact pressure adjusting device between the male and female cones tending to remove the above mentioned disadvantages.

This cone clutch is characterized by the fact that the driving cone of the clutch is integral with the driving wheel of the said clutch so that the kinematic connection connecting the said driving wheel to the driven cone of the clutch is rigid and without play, when the clutch is engaged.

The accompanying drawing shows diagrammatically and by way of example one embodiment of the cone clutch according to the invention.

FIG. 1 shows partly in section a device for the reversal of the direction of rotation of the spindle of a machine-tool comprising cone clutches according to the invention.

FIG. 2 is a detail view to a larger scale of a part of a cone clutch.

The drawing shows very diagrammatically a driving device for a spindle 1 of a machine tool comprising a motor 2 driving the main shaft 3 of a device for the reversal of the direction of rotation of the spindle 1.

This device for the reversal of the direction of rotation of the spindle comprises two cone clutches the driven parts 4 of which are angularly integral with the spindle 1 and the driving parts 6 of which are driven by the main shaft 3. One of these driving parts 6 is driven in one direction through the agency of a toothed wheel 7 in mesh with a driving wheel 8 carried by the said driving part 6. The other of these driving parts 6 is driven in the other direction through the agency of two pinions 9 and 10 one of which is in mesh with the driving wheel 8 of the said driving part.

In this way, as one or the other of the cone clutches is in engagement, the spindle 1 is driven in one or the other direction. A known control device provokes alternately the engagement and the disengagement of the cone clutches.

The two cone clutches are identical in their design and their realization so that only one of them will be hereafter described in detail.

Each of these cone clutches comprises a driven part 4 angularly integral with the spindle 1 thus with the workpiece to be driven. This driven part compirses a male cone 11 movable axially along a sleeve 5 which is angularly integral with the spindle 1, over a certain distance between a rest position and an operating position. The change from the operating position to the rest position of this male cone 11 is controlled by the control device of known type.

Each of these clutches further comprises a driving part 6 comprising on the one hand a female cone 12 adapted to cooperate with the male cone 11, and on the other hand a driving wheel 8 adapted to cooperate with the pinion 10 or with the toothed wheel 7 respectively. This driving part 6 thus ensures the direct kinematic connection between the driving member, that is to say the toothed wheel 7 or the pinion 10, and the driven part 4 of the clutch.

When the clutch is disengaged the driving part 6 to rotates idly on the spindle 1.

An adjusting device permits of modifying the relative axial positions of the male and female cones of the clutch and therefore their contact pressure when this clutch is in engagement.

As best shown in FIG. 2, this adjusting device comprises a sleeve 13 rotating concentrically on the spindle 1 and disposed between the driving part 6 and this spindle 1. The axial position of this sleeve 13 relative to the spindle 1 is fixed for example by means of shoulders 14, 15 and circlips 16, 17 as in the example shown.

This sleeve 13 is threaded on the outside at one of its ends and this thread cooperates with a thread provided in the inner surface of the driving part 6. In this manner, due to this screw coupling it is possible, by angular movement of the sleeve 13, to change the axial position of the driving part 6 and thus adjust the contact pressure of the cones of the clutch when the latter is in engagement.

Thus, it will be appreciated by those persons skilled in the art that, since the driving force is transmitted from the wheel 8 to the male cone 11 through the driving part 6 which combines the wheel 8 and female cone 12 into a single part, there are no elements intervening therebetween.

Each clutch further comprises a device for locking the angular position of the sleeve 13 relative to the driving part 6. This locking device thus permits of fixing the axial position of the driving part 6 in its desired operating position.

This locking device comprises a latch 18 disposed inside an annular recess 19 formed in the outer surface of the sleeve 13 in the non-threaded part of said sleeve and extending along a generating line of this sleeve 13. This latch is maintained in this position by a lug 20 engaged in a circular groove 21 formed in the inner surface of the driving part 6. This latch further comprises a tooth 22 adapted to cooperate with one of the notches 23 formed in the end of the driving part 6 and distributed uniformly on its periphery.

An elastic action 24 tends to retain the latch 18 in an active position such that its tooth 22 is engaged in one of the notches 23. When the latch is in its active position, it fixes the relative angular position between the sleeve 13 and the driving part 6. When the spindle rotates, the centrifugal force attaching to the latch tends to retain the latter in the locked position.

The latch 18 comprises an operating member 25 which permits of moving the said latch from its operative position to its inoperative position against the elastic action 24 for which the tooth 22 escapes from the notch 23 in which it was engaged and is then entirely housed inside the groove 19. When the latch is retained in its inoperative position the user may change the angular position of the sleeve 13 relative to the driving part 6 so as to move this driving part in the axial direction in order to bring it nearer or further apart from the male cone 11.

As a result, the locking device is only subjected to the slight stresses necessary to drive the idle sleeve 13 by the driving part 6 but intervenes in no way in the transmission of the driving couple from the driving wheel 8 to the driven part 4.

One embodiment of the cone clutch according to the invention has been described but it is obvious that numerous constructive modifications could be considered without departing from the scope of the protection claimed.

Moreover a particular use of the clutch according to the invention has been illustrated but it is obvious that the cone clutches according to the invention may be employed for any other desired use.

I claim:

In a cone clutch of the class described, the combination comprising; a driving part formed with an axial bore and an inner annular groove within said bore and including a cone, and a driven part including a cone for cooperating with the first mentioned cone to effect transmission of motion substantially free of play from the driving to the driven part, said parts being adapted for rotation about the same axis, a sleeve formed with an axially elongated recess communicating with said annular groove of said driving part, said sleeve being mounted for rotation and axial movement relatively to said driven part and adjustably threadedly connected to the inner surface of said axial bore for rotation with said driving part, a latch comprising an elongated body having a lug and a toothed portion at opposite ends of said body and being positioned within the recess formed in said sleeve with said lug adapted to extend into said groove, a plurality of circumferentially spaced notches formed in the periphery of said driving part, said toothed portion of said latch being selectively engageable with said notches, and resilient means operatively connected to said latch to urge said toothed portion into engagement with a selected one of said notches, whereby the axial position of the driving cone may be adjusted and locked by adjustment of the threaded connection of said sleeve and said driving part and engaging said toothed portion in a selected one of said notches thus to control the contact pressure of said cones when they are in engagement.

References Cited by the Examiner

UNITED STATES PATENTS

| | | | |
|---|---|---|---|
| 1,895,600 | 1/1933 | Anglemger | 192—111 X |
| 2,095,816 | 10/1937 | Johansen | 192—111 X |
| 2,348,891 | 5/1944 | Eason | 192—110 X |
| 2,386,477 | 10/1945 | Kraft. | |
| 2,437,737 | 3/1948 | Halby | 192—111 X |
| 2,519,026 | 8/1950 | Cuhat | 192—11 X |
| 2,539,020 | 1/1951 | Kadz | 192—111 X |

DAVID J. WILLIAMOWSKY, *Primary Examiner.*

DON A. WAITE, B. W. WYCHE, *Examiners.*